E. C. ENGELBERG.
MACHINE FOR HULLING AND POLISHING RICE.
APPLICATION FILED APR. 15, 1912.
1,105,635.
Patented Aug. 4, 1914.
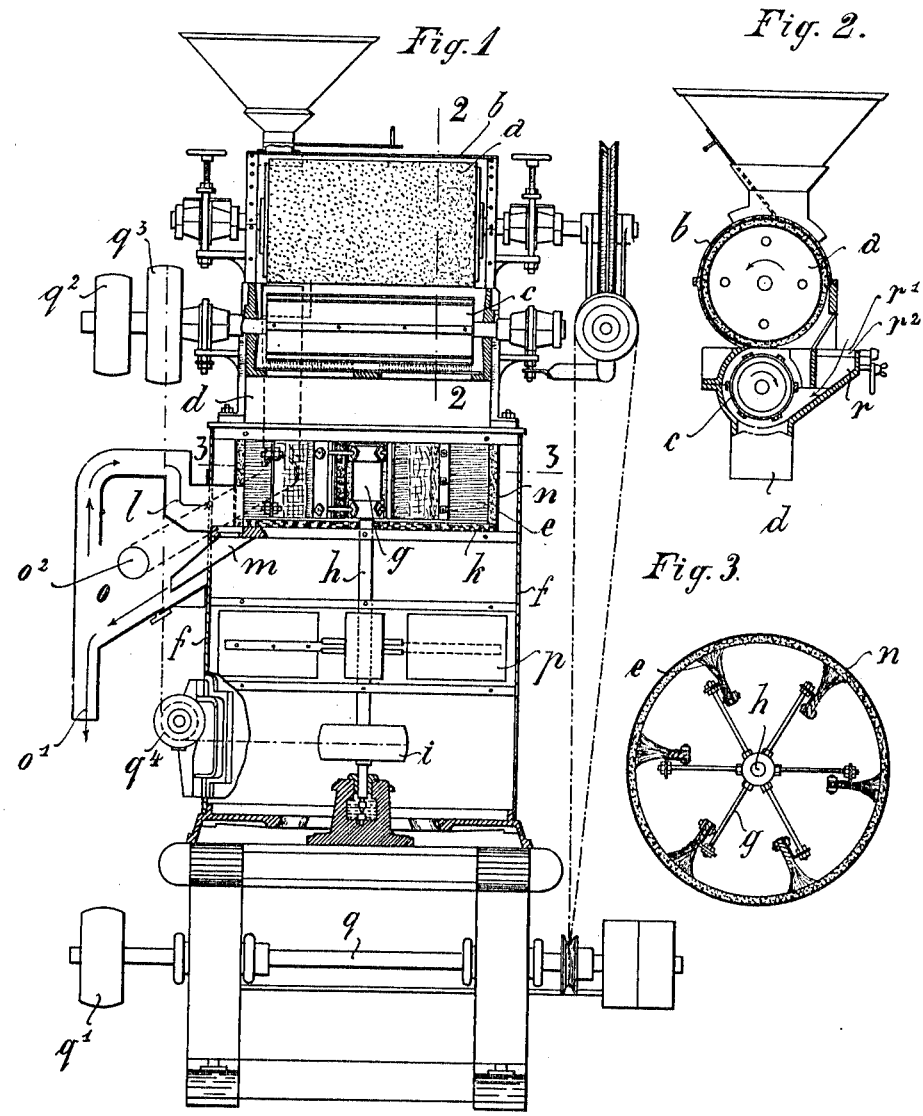

UNITED STATES PATENT OFFICE.

EVARISTO CONRADO ENGELBERG, OF SÃO PAULO, BRAZIL.

MACHINE FOR HULLING AND POLISHING RICE.

1,105,635.  Specification of Letters Patent.  Patented Aug. 4, 1914.

Application filed April 15, 1912. Serial No. 690,753.

*To all whom it may concern:*

Be it known that I, EVARISTO CONRADO ENGELBERG, a citizen and resident of São Paulo, Brazil, have invented a new and useful Machine for Hulling and Polishing Rice, of which the following is a specification.

My invention relates to a machine of the character referred to which has a pair of rollers arranged below the feeding hopper. The upper and larger one of the two rollers has a roughened surface and is tightly inclosed by a casing, the rice grains being acted on by the casing and the roller in order to remove their skin. The lower roller is of smaller diameter than the upper one and has prongs which separate the skins from the grains. The mixture of skins and grains falls into a cylindrical chamber the roughened inside of which is engaged by rotary polishing brushes. These brushes are fixed on a rapidly rotating star wheel. They force the grains against the roughened inside of the cylinder and, in doing so, slide over and polish them. A ventilator arranged below the polishing cylinder forces air through the perforated bottom of said cylinder and toward the rollers where a discharge opening for the skins is provided. The hulled and polished rice is removed through a lateral hopper through which air is drawn by the ventilator so that skins and dust which might be mixed with the grains are drawn upward and thrown out.

Reference is to be had to the accompanying drawings in which—

Figure 1 is a vertical section of the machine, Fig. 2 is a section on line 2—2, and Fig. 3 a section on line 3—3 of Fig. 1.

The roller $d$ which is carried in vertically adjustable bearings has a roughened surface and is preferably shaped as a hollow cylinder of emery, porcelain or any other material to which a lasting roughness can be imparted. It is inclosed by a casing $b$ at rather a short distance which casing is preferably also roughened on its inside. The roller $c$ which is below roller $a$ has prongs or other suitable projections which are preferably longitudinal ribs on the circumference of the drum and which may alternate with comb- or brush shaped pieces. Such brushes, arranged like a grate, may also be disposed at the bottom of the casing of roller $c$ where it connects with hopper $d$, as indicated in Fig. 1. The polishing chamber which is below $d$ is in the shape of a cylindrical drum coated on the inside with some rough material similar to that of roller $a$ which is acted on by the brushes $e$. These are fixed to the star wheel $g$ the nave of which is fixed on a vertical shaft $h$ to which motion is imparted by a pulley $i$. The bottom of the polishing cylinder is a sieve $k$ the meshes of which are so wide as to allow only broken grains to pass but to retain the good ones. Skins and dust are blown upward. The brushes $e$ engage the sieve with their ends. To the casing $f$ and the bottom of it is connected an air pipe $l$. That part of pipe $l$ which is between the casings $f$ and $n$ has at its bottom a discharge hopper $m$ which opens into a chamber $o$. At the top of the chamber $o$ are branched off the air pipe $l$ and a second air pipe $o^2$ which passes upward between rollers $a$ and $c$. The blower $p$ which is below the cylinder $f$ and fixed on shaft $h$ forces a current of air through the sieve $k$ into the polishing cylinder which takes skins and dust upward but cannot take up the broken grains which fall through the sieve. The blower also draws air into chamber $o$ through $o^1$. The current of air forced by the blower $p$ into the polishing chamber also causes a suction of air through the end of $o'$ of the chamber $o$, and this air is drawn upward through the air pipes $l$ and $o^2$.

The machine is actuated from a shaft $q$ which by means of pulleys $q^1$ and $q^2$ operates the lower roller $c$. On the shaft of this roller is a pulley $q^3$ from which a belt passes to pulley $i$ over a roller $q^4$. Opposite rollers $a$ and $c$ there is an air discharge $r$ (Fig. 2) which has grates $r^1$ $r^2$, the widths of which can be varied by means of slides, so that heavy, *i. e.* good grains cannot be blown into the dust chamber which is connected to the discharge. Broken grains fall through the sieve $k$ while the skins which together with the good grains are discharged through hopper $m$ are taken into pipes $l$ or $o^2$ by the air current. The machine may also be used for hulling other material than rice.

I claim:

1. The combination with substantially horizontal hulling rollers and their casing, of a substantially vertical polishing chamber into which the casing discharges by gravity, an air chamber having an inlet connection with the lower portion of the polishing chamber, and an inlet connection with said casing and means to direct a current of air upward through the polishing chamber and casing, thereby inducing a current of air through said air chamber and connections.

2. The combination with horizontal hulling rolls and their casing; of a vertical cylindrical polishing chamber having a perforated bottom and into which said rolls discharge, an air chamber having a downwardly directed air inlet, an inlet connection with the lower portion of the polishing chamber, and an inlet connection with the casing, said polishing chamber having a grain discharge into said air chamber and through its downwardly directed inlet, and a fan blower beneath the polishing chamber to direct a current of air through the casing, thereby causing a suction through said air chamber and its connections.

3. The combination with horizontal hulling rolls, and their casing, of a vertical cylindrical polishing chamber having a roughened internal surface and arranged below said rolls, one side of said cylinder being formed as a sieve, rotary brushes engaging the internal surface of said casing and sieve, air passages connecting the casing of said rollers with the casing of said brushes, a blower arranged in proximity to said sieve and adapted to force a current of air through the sieve into said casings, an air chamber connected with the said passages, an upwardly directed pipe for admitting air to said chamber, a hopper connected with the sieve side of the polishing chamber, and adapted to discharge the grain through the upwardly directed pipe in opposite direction to the air drawn into the latter.

EVARISTO CONRADO ENGELBERG.

Witnesses:
RODOLPHO WAGNER,
PETER NICHERS.

---

Copies of this patent may be obtained for five cents each, by addressing the "Commissioner of Patents, Washington, D. C."